Figure 1:
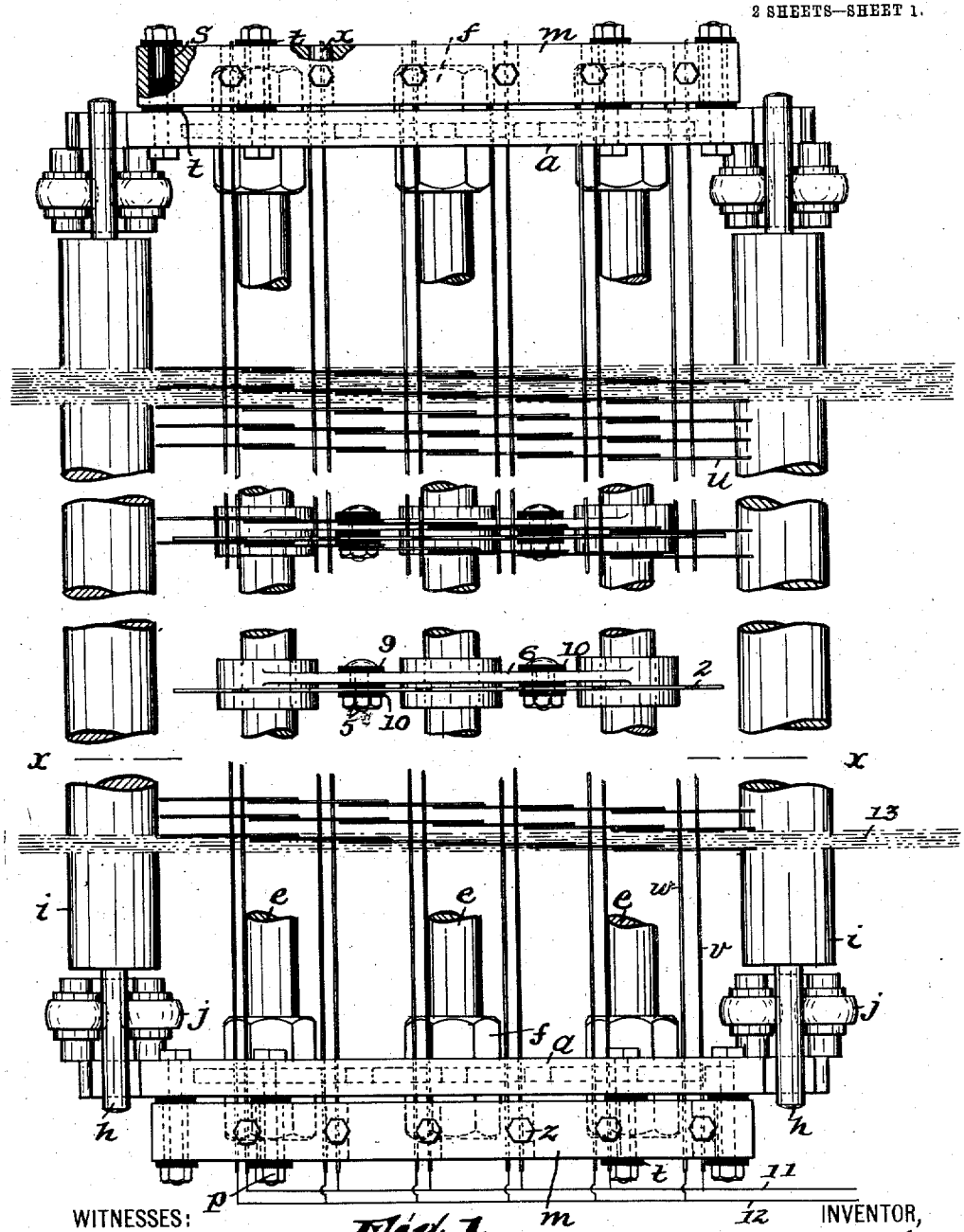

No. 12,422. REISSUED DEC. 12, 1905.

J. B. WHITNEY.

ELECTRICAL STOP MOTION MECHANISM FOR TEXTILE MACHINERY.

APPLICATION FILED OCT. 2, 1905.

2 SHEETS—SHEET 1.

WITNESSES:

Wm. D. Bell.

Adele G. Latt.

INVENTOR,

Joseph B. Whitney,

BY

Gartner & Stewart,

ATTORNEYS.

No. 12,422. REISSUED DEC. 12, 1905.
J. B. WHITNEY.
ELECTRICAL STOP MOTION MECHANISM FOR TEXTILE MACHINERY.
APPLICATION FILED OCT. 2, 1905.
2 SHEETS—SHEET 2.
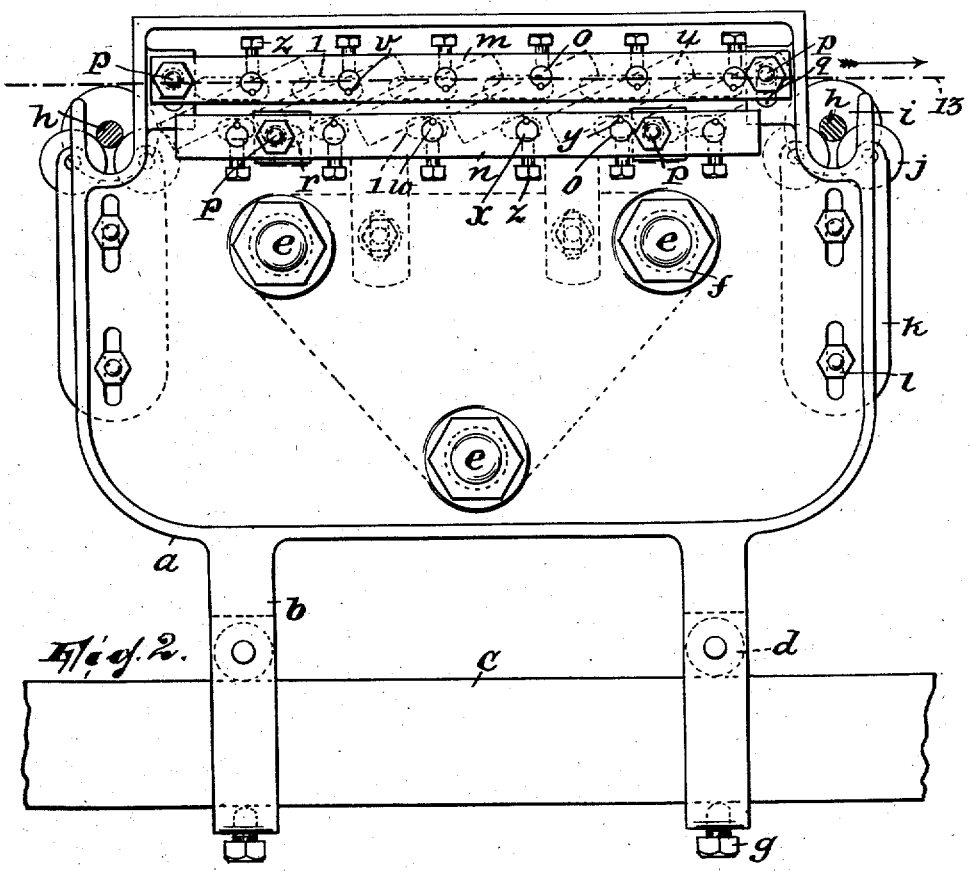
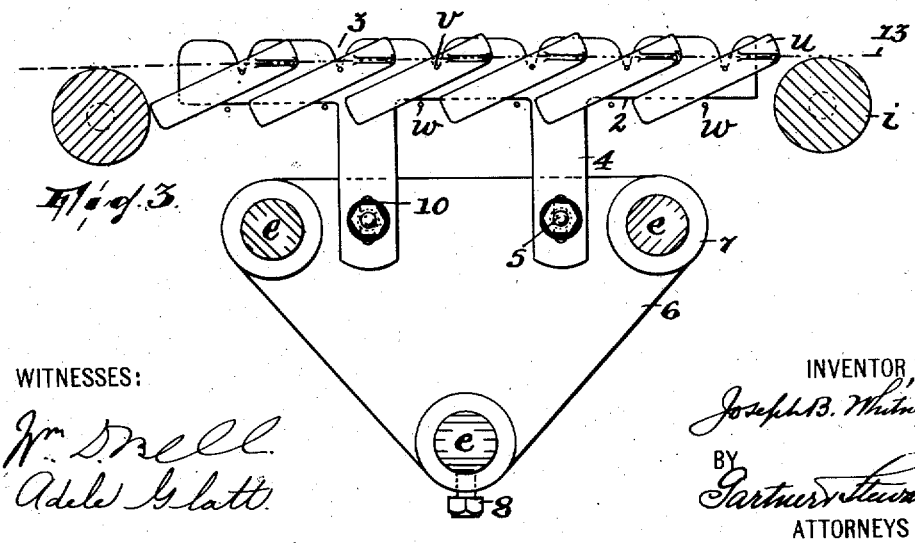
WITNESSES:
Wm. Dell.
Adele Glatt.
INVENTOR,
Joseph B. Whitney,
BY
Gartner & Stewart,
ATTORNEYS.

UNITED STATES PATENT OFFICE.

JOSEPH B. WHITNEY, OF BROOKLYN, NEW YORK.

ELECTRICAL STOP-MOTION MECHANISM FOR TEXTILE MACHINERY.

No. 12,422. Specification of Reissued Letters Patent. Reissued Dec. 12, 1905.

Original No. 787,653, dated April 18, 1905. Application for reissue filed October 2, 1905. Serial No. 281,091.

*To all whom it may concern:*

Be it known that I, JOSEPH B. WHITNEY, a citizen of the United States, residing in Brooklyn, State of New York, have invented a certain new and useful Electrical Stop-Motion Mechanism for Textile Machinery, of which the following is a specification.

This invention relates to mechanism adapted to automatically stop textile machinery upon any irregularity in the action thereof; and it has reference particularly to such mechanism as applied to that portion of textile machinery which might be classified as that having to do with the drawing of threads or other filaments longitudinally, as in spinning, weaving, warping, &c.

It has heretofore been proposed to stop textile machinery when any irregularity occurs in the operation thereof by the use of electromagnetic mechanism. For instance, in weaving fallers or detectors have been arranged on the warp-threads in such manner that upon a break in any of the latter the corresponding faller or detector drops, closing a circuit whereby a magnet is actuated to move its armature and through it certain mechanical contrivances which either throw off the power from the loom or brake it. In my United States Letters Patent No. 790,768 I have disclosed an improved faller or detector of the pivoted type. I have found that it is very advantageous to employ as the pivoting means for the fallers and as contact devices constituting the terminals of the electric circuit with which each detector or faller coacts as a circuit-closer taut stout wires of relatively small gage. In so far as acting as a pivot is concerned, being of small diameter such a bearing for the detectors or fallers offers little friction, and so permits the fallers or detectors to be pivoted in such manner that while producing the minimum amount of abrasion on the threads they will promptly respond to the action of gravity to close the circuit should any of the threads break, and in so far as acting as a contact device is concerned wires are especially desirable, because they offer the minimum amount of surface for the deposit of dust, lint, and the like.

My present invention therefore has in view the employment of taut wires or the like for the pivotal supports for the detectors or fallers, as well as for the contact devices coacting with said detectors or fallers.

It also has in view to provide a simple, compact, readily-adjustable, and otherwise practical means for sustaining said wires.

In the accompanying drawings, Figure 1 is a top plan view of my invention. Fig. 2 is a side view, and Fig. 3 is a vertical sectional view taken on the line *x x* in Fig. 1.

*a* designates two plates or side frames, each having integral downwardly-projecting loops *b*, which receive a horizontal rail *c*, which may form a portion of the frame of the loom or other machine in which the mechanism is arranged, said loops affording bearings for antifriction-rollers *d*, which take upon the top of the rails *c*. *e* designates tie-bars, preferably three in number, whereby through the medium of clamping-nuts *f*, screwed on their ends, said plates *a* are secured in relatively fixed disposition parallel with each other. Assembled as shown in Fig. 1, parts *a* and *e* form a supporting structure or frame, which is adjustable on the rails *c* in the direction of the length thereof, set-screws *g* being provided in the loops to secure said frame in any desired position.

The upper corners of plates *a* are recessed for the reception of the trunnions *h* of rollers *i*, said trunnions being journaled on antifriction-bearings *j*, journaled in brackets *k*, which are secured adjustably to the plates *a* by a slot-and-bolt connection *l*.

Against the outer face of each plate *a* take horizontal bars *m n*. The bars are provided with openings *o* at regular intervals, those in the bar *n* being in staggered relation with reference to those of the bar *m*. Each bar is secured to the plate by bolts *p*, the bolts *p* for bars *m* penetrating vertical slots *q* in plates *a*, while the bolts *p* for the bars *n* penetrate horizontal slots *r* in the plates. The bars are insulated from the plates by non-conducting sleeves *s*, surrounding each bolt *p* and penetrating the bar, and non-conducting washers *t*, interposed between the bar and the nut (or head as the case may be) of the bolt on the one hand and the bar and the plate on the other hand.

*u* designates the fallers or detectors. So far as the subject at present in hand is concerned it is only necessary to describe these fallers as being of the pivoted kind, the pivoting-point of each being by preference in proximity to but not quite at a point midway its length.

*v* designates the wires which serve both as pivots for the fallers and as one set of contact devices with which said fallers coact to close the circuit, and *w* designates the wires constituting the other set of contact devices. These wires are secured in the disposition illustrated in the drawings and under tension by means of plugs *x*, which are inserted in the openings *o* in the bars and have longitudinal recesses *y* receiving the wires, each plug when the desired tension has been put upon the wires being made to act against the wire as a clamp by means of a set-screw *z*, mounted in the respective bar and adapted to take against the plug. To accommodate the wires without their contacting with the plates, the latter are formed with openings 1, through which the wires extend. Inasmuch as the weight of the fallers tends to depress wires *v*, this effect is counteracted by the supporting means illustrated in Fig. 3, where 2 is a notched brace interposed between the sets of wires *v* and *w* and receiving in its notches 3 wires *v*, said brace being provided with integral legs 4, which have a slot-and-bolt connection 5 with a supporting-plate 6, mounted on tie-bars *e*, so as to be adjustable horizontally. Tie-bars *e* penetrate bosses 7 in plate 6, and one of these bosses may carry a set-screw 8, adapted to be set up against the corresponding tie-bar *e* to fix the plate 6 against lateral movement. An insulating-sleeve 9 and washer 10 are employed to electrically separate brace 2 from the plate 6 at the connections 5.

11 and 12 designate the terminal portions of the circuit with which wires *v* and *w* are connected.

The threads (indicated at 13) are extended over rollers *i* and through the several fallers. In this position they maintain the fallers out of contact with the wires *w*, so that the circuit is at this point broken. Should a thread break, the corresponding faller will turn on its pivot, closing the circuit, and thus setting in actuation the throw-off mechanism of the machine. My arrangement permits not only of adjusting each wire individually to the desired tension, but includes means arranged in the supporting structure for adjusting the two sets of wires either vertically to and from each other or horizontally, so that by the manipulation of a comparatively few number of parts the whole set of fallers may be adjusted to a nicety relatively to the contact-wires *w* and the threads 13 controlled.

Upon reference to Figs. 2 and 3 it will be seen that instead of each set of wires being arranged in a perfect plane they are arranged in parallel arcs of circles whose highest points approximate the innermost wires in each set. The reason for this is that since the fallers act by their weight to lift the threads higher at points remote from the rollers *i* than at points in proximity to said rollers it becomes necesary to correspondingly elevate the pivots of the fallers, as well as also the devices with which they drop into contact, so as to keep all the fallers at relatively the same angle.

Having thus fully described my invention, what I claim as new, and desire to secure by Letters Patent, is—

1. In a stop-motion mechanism for textile machinery, the combination of pivoted detectors or fallers, wires, each of said detectors or fallers being adapted to coact with said wires as a circuit-closer, and means for maintaining said wires under tension, substantially as described.

2. In a stop-motion mechanism for textile machinery, the combination of pivoted detectors or fallers, wires, each of said detectors or fallers being pivoted on one wire and adapted to contact with the other wire as a circuit-closer, and means for maintaining said wires under tension, substantially as described.

3. The combination of spaced supports, a pair of wires constituting contact devices, fallers pivoted on one of said wires and movable into engagement with the other wire, and means, adjustably mounted in said supports, for securing said wires under tension, substantially as described.

4. In a stop-motion mechanism for textile machinery, the combination of pivoted detectors or fallers, wires, each of said detectors or fallers being adapted to coact with said wires as a circuit-closer, and means, comprising individual clamps for each wire, and mounted independently of each other, for maintaining said wires under tension, substantially as described.

5. In a stop-motion mechanism for textile machinery, the combination of pivoted detectors or fallers, wires, each of said detectors or fallers being adapted to coact with said wires as a circuit-closer, a suitable supporting structure, and means, adjustable in said structure transversely of the wires, for maintaining said wires under tension, substantially as described.

6. The combination, with a suitable supporting structure, of fallers, an electric-circuit-terminal structure comprising bars held spaced by the supporting structure, substantially parallel taut wires secured at each end to one of said bars and adapted to be contacted by the fallers as circuit-closers, and means for insulating said bars from the supporting structure, substantially as described.

7. The combination of spaced supports, a pair of wires constituting contact devices and penetrating said supports, fallers pivoted on one of said wires and movable into engagement with the other wire, and adjustable clamping means adapted to maintain said wires under tension and arranged against the relatively outer sides of said supports, substantially as described.

8. The combination of spaced supports, pairs of bars arranged against the relatively outer sides of said supports, sets of wires penetrating said supports, means for clamping each set of wires in one of the pairs of bars under tension, detectors or fallers pivoted on one set of wires and engageable with the other set of wires, and means for adjustably securing said bars to the supports, substantially as described.

9. The combination of spaced supports, wires, means for securing said wires to the supports under tension, an auxiliary support for the wires disposed between and spaced from said first-named supports, and fallers or detectors arranged on some of said wires, and adapted to contact with the other, substantially as described.

10. The combination of spaced means for holding a series of threads taut, pivoted fallers, and a supporting means for said fallers, said fallers normally engaging the threads at intervals between said holding means, and the pivots of the fallers remote from the holding means being disposed in a plane different from the plane of the pivots of the fallers adjacent the holding means, substantially as described.

11. The combination of spaced means for holding a series of threads taut, pivoted fallers and faller-supporting means, said fallers normally engaging said threads at intervals between said holding means and pressing upwardly thereon, and the pivots of the fallers remote from the holding means being higher than the pivots of those adjacent the holding means, substantially as described.

In testimony whereof I have hereunto signed my name in the presence of two subscribing witnesses.

JOSEPH B. WHITNEY.

Witnesses:

WM. D. BELL,

JOHN W. STEWARD.